United States Patent
Cheng

(10) Patent No.: US 11,853,247 B2
(45) Date of Patent: Dec. 26, 2023

(54) INTERFACE SWITCHING APPARATUS, COMMUNICATION DEVICE, AND INTERFACE SWITCHING METHOD

(71) Applicant: BOE Technology Group Co., Ltd., Beijing (CN)

(72) Inventor: Xinyi Cheng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 13 days.

(21) Appl. No.: 17/762,013

(22) PCT Filed: May 17, 2021

(86) PCT No.: PCT/CN2021/094196
§ 371 (c)(1),
(2) Date: Mar. 18, 2022

(87) PCT Pub. No.: WO2021/254063
PCT Pub. Date: Dec. 23, 2021

(65) Prior Publication Data
US 2022/0334996 A1 Oct. 20, 2022

(30) Foreign Application Priority Data
Jun. 18, 2020 (CN) .......................... 202010559467.5

(51) Int. Cl.
*G06F 13/40* (2006.01)
(52) U.S. Cl.
CPC ...... *G06F 13/4022* (2013.01); *G06F 2213/40* (2013.01)
(58) Field of Classification Search
CPC ............. G06F 13/4022; G06F 2213/40; G06F 13/385; G06F 13/4068
See application file for complete search history.

(56) References Cited

U.S. PATENT DOCUMENTS

| | | | |
|---|---|---|---|
| 8,661,281 B2* | 2/2014 | Chang | G06F 1/3287 713/320 |
| 2003/0132737 A1* | 7/2003 | Lin | G06F 1/3203 323/282 |

(Continued)

FOREIGN PATENT DOCUMENTS

| | | |
|---|---|---|
| CN | 202600690 U | 12/2012 |
| CN | 202976069 U | 6/2013 |

(Continued)

OTHER PUBLICATIONS

CN202010559467.5 first office action and search report.

*Primary Examiner* — Faisal M Zaman
(74) *Attorney, Agent, or Firm* — IPro, PLLC

(57) ABSTRACT

An interface switching apparatus, communication equipment, and an interface switching method. The first end of the interface converting assembly is connected to a common interface, the second end of the interface converting assembly is connected to the controller, and the interface converting assembly is configured to control the common interface to connect to a target interface of at least two peripheral interfaces according to a control signal sent by the controller; the detection assembly is connected to the controller and the at least two peripheral interfaces, respectively, the detection assembly is configured to detect voltage signals at the at least two peripheral interfaces; the controller is configured to determine, according to the voltage signal, a target interface to which an external device is connected of the at least two peripheral interfaces, generate the control signal, and send the control signal to the interface converting assembly.

18 Claims, 4 Drawing Sheets

(56) References Cited

U.S. PATENT DOCUMENTS

| | | | |
|---|---|---|---|
| 2003/0233499 A1* | 12/2003 | Choi | G06F 13/387 |
| | | | 710/36 |
| 2006/0047982 A1* | 3/2006 | Lo | G06F 1/266 |
| | | | 713/300 |
| 2007/0115954 A1 | 5/2007 | Wu et al. | |
| 2010/0115150 A1* | 5/2010 | Hachiya | G06F 1/266 |
| | | | 713/300 |
| 2011/0234172 A1* | 9/2011 | Kung | H02J 7/00 |
| | | | 320/137 |
| 2014/0201420 A1* | 7/2014 | Hsieh | G06F 13/4068 |
| | | | 710/316 |
| 2018/0275732 A1* | 9/2018 | Chen | G06F 1/266 |
| 2018/0316373 A1* | 11/2018 | Li | H04L 12/40045 |
| 2020/0022075 A1 | 1/2020 | Lu | |
| 2022/0261056 A1* | 8/2022 | Motoi | G09G 5/12 |

FOREIGN PATENT DOCUMENTS

| | | |
|---|---|---|
| CN | 104573468 A | 4/2015 |
| CN | 106445432 A | 2/2017 |
| CN | 107220192 A | 9/2017 |
| CN | 108228509 A | 6/2018 |
| CN | 108733609 A | 11/2018 |
| CN | 109922293 A | 6/2019 |
| CN | 210109792 U | 2/2020 |
| CN | 111694779 A | 9/2020 |

\* cited by examiner

INTERFACE SWITCHING APPARATUS, COMMUNICATION DEVICE, AND INTERFACE SWITCHING METHOD

CROSS REFERENCE TO RELEVANT APPLICATIONS

The present disclosure claims priority to the Chinese patent application No. 202010559467.5 entitled "INTERFACE SWITCHING APPARATUS, COMMUNICATION DEVICE, AND INTERFACE SWITCHING METHOD" filed on Jun. 18, 2020, to the China National Intellectual Property Administration, the entire contents of which are incorporated herein by reference.

TECHNICAL FIELD

The present disclosure relates to the technical field of communications, and more particularly to an interface switching apparatus, communication equipment, and an interface switching method.

BACKGROUND

With the rapid development of the Internet of Things technology, the demand for communication modules is increasing, and at the same time, the demand for the functions of communication module products is changing.

In related technical solutions, a communication module is generally provided with an external interface terminal, such as a PCIE, a USB, an M2 interface, etc. for directly connecting to a specific type of external device, or connecting to an incompatible external device via an external interface converting assembly.

SUMMARY

The present disclosure provides an interface switching apparatus, communication equipment, and an interface switching method.

The present disclosure discloses an interface switching apparatus, comprising: an interface converting assembly, a detection assembly, and a controller; wherein,
  a first end of the interface converting assembly is connected to a common interface, a second end of the interface converting assembly is connected to the controller, and the interface converting assembly is configured to control the common interface to connect to a target interface of at least two peripheral interfaces according to a control signal sent by the controller;
  the detection assembly is respectively connected to the controller and the at least two peripheral interfaces, and the detection assembly is configured to detect voltage signals at the at least two peripheral interfaces;
  the controller is configured to determine, according to the voltage signal, a target interface to which an external device is connected of the at least two peripheral interfaces, generate the control signal, and send the control signal to the interface converting assembly.

Optionally, wherein the interface switching apparatus further includes: a voltage converting assembly;
  the voltage converting assembly is connected to the interface converting assembly and the controller, respectively, and the voltage converting assembly is configured to convert a voltage supplied from an external power source to the interface converting assembly and the controller, and output converted voltage to the interface converting assembly and the controller, respectively.

Optionally, wherein the detection assembly includes at least two groups of detection circuits, each group of detection circuits is correspondingly connected to the peripheral interface, and each group of the detection circuits includes: a first resistor, a second resistor, a third resistor, a fourth resistor, a transistor, and a diode;
  one end of the first resistor is electrically connected to an anode of the diode and a corresponding peripheral interface, respectively, and the other end of the first resistor is electrically connected to one end of the second resistor and one end of the third resistor, respectively;
  the other end of the second resistor is grounded, and the other end of the third resistor is electrically connected to a control electrode of the transistor;
  a cathode of the diode is electrically connected to a first pole of the transistor and a power supply power source, respectively; and
  a second pole of the transistor is grounded through the fourth resistor and being electrically connected to the controller, and a detection voltage for the corresponding peripheral interface is input to the controller.

Optionally, wherein the interface switching apparatus further includes a communication module;
  the communication module is connected to the voltage converting assembly and the common interface, respectively.

Optionally, wherein the communication module is a 5G communication module.

Optionally, wherein the controller is configured to acquire access priorities of the peripheral interfaces connected with the external devices according to the voltage signal, determine a target peripheral interface in the peripheral interfaces connected with the external devices according to the access priority, generate a control signal of the target peripheral interface, and send the control signal to the interface converting assembly; and
  the interface converting assembly is configured to control the second end of the common interface to connect to the target peripheral interface according to the control signal.

Optionally, wherein the peripheral interface is at least two of a USB interface, a PCIE interface, and an M2 interface.

Optionally, wherein the quantity of the detection assembly is in consistent with the quantity of the peripheral interface.

The present disclosure discloses communication equipment, wherein the communication equipment includes the interface switching apparatus as any one as mentioned above.

The present disclosure discloses an interface switching method, wherein the interface switching method includes:
  acquiring voltage signals of at least two peripheral interfaces;
  determining a target interface to which an external device is connected of the at least two peripheral interfaces according to the voltage signal; and
  controlling a common interface to be electrically connected to the target interface.

Optionally, wherein the determining a target interface to which an external device is connected of the at least two peripheral interfaces according to the voltage signal includes:

determining at least two initial peripheral interfaces to which the external devices are connected of the at least two peripheral interfaces according to the voltage signal; and determining a target interface of the at least two peripheral interfaces according to pre-saved access priorities of the at least two initial peripheral interfaces.

The present disclosure discloses a computing-processing device, wherein the computing-processing device includes:

a memory in which a computer readable code is stored; and one or more processors, wherein when the computer readable code is executed by one or more processors, the computing-processing device executes the interface switching method according to any one as mentioned above.

The present disclosure discloses a computer program, wherein the computer program includes a computer readable code, when the computer readable code is executed on computing-processing device, cause the computing-processing device to execute the interface switching method according to any one as mentioned above.

The present disclosure discloses a computer-readable medium, wherein the computer-readable medium stores the computer program according to any one as mentioned above.

The above description is merely an overview of the technical solutions of the present disclosure, which may be implemented in accordance with the contents of the description in order to make the technical means of the present disclosure more clearly understood. In order to make the above and other objects, features, and advantages of the present disclosure more apparent and comprehensible, preferred embodiments of the present disclosure are set forth below.

BRIEF DESCRIPTION OF THE DRAWINGS

In order to illustrate the embodiments of the present disclosure or the technical solutions in the related art more clearly, the following will briefly introduce the accompanying drawings needed to be used in the description of the embodiments or related art; obviously, the drawings in the description below are some embodiments of the present disclosure, and for those of ordinary skills in the art, other drawings may also be obtained from these drawings without creative efforts.

DETAILED DESCRIPTION OF THE EMBODIMENTS

In order to make the above objects, features, and advantages of the present disclosure more obvious and understandable, the present disclosure will be described in further detail below with reference to the accompanying drawings and specific implementation modes. Obviously, the described embodiments are some, but not all, embodiments of the present disclosure. Based on the embodiments in the present disclosure, all other embodiments obtained by a person of ordinary skills in the art without inventive efforts fall within the scope of the present disclosure.

Figure 1:
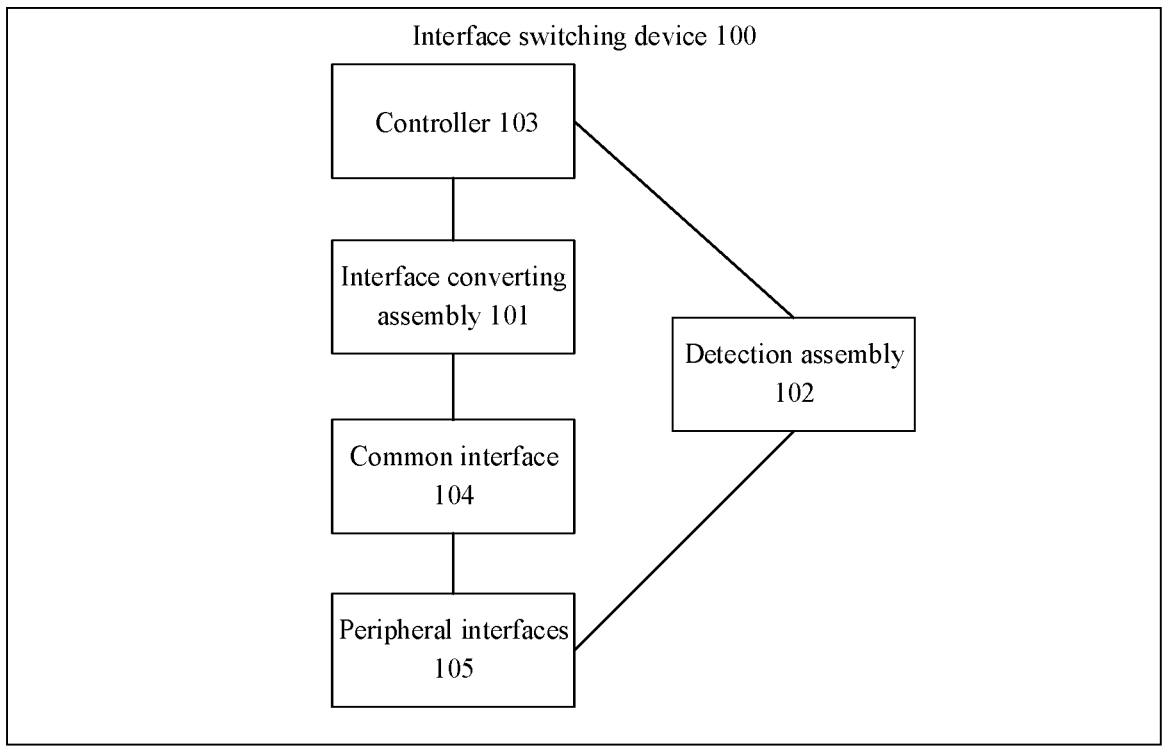
FIG. 1 is a schematic structural diagram of an interface switching apparatus provided by an embodiment of the present disclosure.

Referring to FIG. 1, there is shown a schematic structural diagram of an interface switching apparatus provided by an embodiment of the present disclosure. As shown in FIG. 1, the interface switching apparatus 100 may include an interface converting assembly 101, a detection assembly 102, and a controller 103.

The first end of the interface converting assembly 101 is connected to a common interface 104 and the second end is connected to the controller 103, and the interface converting assembly 101 may be configured to control the common interface 104 to be connected to a target interface of at least two peripheral interfaces 105 according to a control signal sent by the controller 103.

The detection assembly 102 may be connected to the controller 103 and at least two peripheral interfaces 105, respectively, and the detection assembly 102 may be configured to detect voltage signals of the at least two peripheral interfaces 105.

The controller 103 may be configured to determine a target interface, to which the external device is connected, of at least two peripheral interfaces 105 according to the voltage signal, generate a control signal, and send the control signal to the interface converting assembly 101.

The present embodiment may be applied to a communication module, wherein at least two peripheral interfaces are disposed on the communication module, and the peripheral interfaces may comprise at least two of a USB interface, a PCIE interface, and an M2 interface.

A detection assembly is disposed in the communication module; the voltage signal at a peripheral interface may be detected in real time via the detection assembly; it may be determined at which peripheral interface the external device is connected by detecting the voltage signal at a preset interface. For example, the peripheral interface includes an interface 1, an interface 2, and an interface 3. When the interface is not connected with external device, the detected voltage value is 0, and when the external device is connected, a voltage value of specified size may be detected. For instance, when a voltage signal of the interface 2 is detected, it indicates that the interface 2 is inserted with the external device.

Certainly, in the present embodiment, the detection assembly is disposed in one-to-one correspondence with the peripheral interface, that is, the quantity of the detection assembly and the quantity of the peripheral interface is the same. When the detection assembly detects that a target interface in the pre-set interface is inserted with external device, the detected voltage signal may be sent to the controller, and the controller may determine, according to the detection assembly detecting the voltage signal, an interface to which the external device is connected, namely, a target interface in at least two peripheral interfaces.

After the target interface is determined, a control signal corresponding to the target interface may be generated by the controller and sent to the interface converting assembly, and the interface converting assembly controls the common interface to connect to the target interface so as to implement automatic switching between the common interface and the peripheral interface inserted with the external device.

The above-described process may be described in detail as follows in conjunction with FIG. 2.

Figure 2:
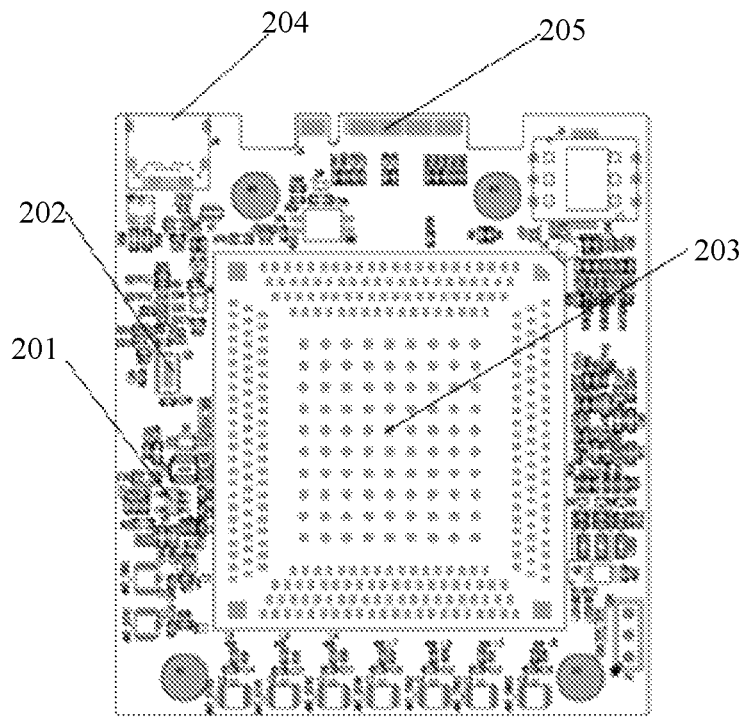
FIG. 2 is a schematic structural diagram of another interface switching apparatus provided by an embodiment of the present disclosure.

FIG. 2 shows that two peripheral interfaces are disposed on the 5G communication module, which are a USB interface 204 and an M2 interface 205, respectively; the communication protocol inside the 5G communication module is a USB protocol; when the module is connected to host equipment, the host equipment may supply power to the 5G communication module, and the 5G communication module may also include: a voltage converting assembly 201, an interface converting assembly 202, and a Land Grid Array (LGA) module.

After the 5G communication module is connected with the host equipment, the host equipment supplies power to the 5G communication module, and at this time, the voltage converting assembly 201 performs voltage converting processing on the voltage output by the host equipment to each module so as to output a corresponding voltage to each module, respectively.

After power-on, the controller enters a working state such that the state of the detection assembly may be acquired in real time so as to determine which peripheral interface is connected to the external device. Then the controller generates a corresponding control signal so as to send the control signal to the interface converting assembly such that the interface converting assembly switches the common interface to the target interface connected to the external device.

The overall implementation process of the present embodiment may be described in detail below with reference to FIG. 3.

Figure 3:
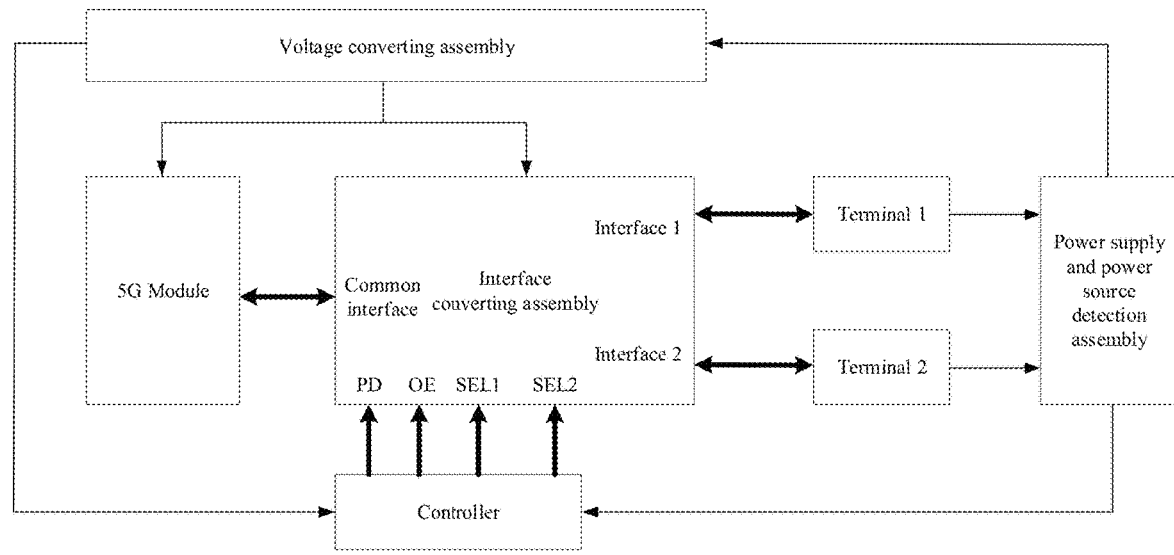
FIG. 3 is a schematic structural diagram of a communication module provided by an embodiment of the present disclosure.

With reference to FIG. 3, taking a communication module as an example, as shown in FIG. 3, the communication module may include: a voltage converting assembly (namely, the voltage converting assembly described above), a 5G communication module (5G Module), a common interface, an interface 1, an interface 2, a terminal 1, a terminal 2, a power supply and power source detection assembly (namely, the detection assembly described above), and a controller module (namely, the controller described above).

After the communication module is connected to the host equipment, the host equipment supplies power to the communication module. Since the voltages required by each module are different, the voltage output by the host equipment to the communication module may undergo voltage conversion via the voltage converting assembly at this moment, and a corresponding voltage is output to each module after the voltage conversion.

The interface 1 and the terminal 1, and the interface 2 and the terminal 2 are disposed correspondingly, respectively. The power supply and power source detection assembly are connected to the terminal 1 and the terminal 2, respectively, and may detect the voltage signal at the terminal 1 and the terminal 2. Both the interface converting assembly and the 5G communication module are connected to the common interface.

After detecting the voltage signal at the terminal 1 or the terminal 2 by the power supply and power source detection assembly, a controller module may generate a corresponding control signal so as to send the control signal to the interface converting assembly such that the interface converting assembly connects the common interface to the interface 1 or the interface 2; for example, when detecting that a voltage signal is present at the terminal 1, the controller module may generate a control signal corresponding to the interface 1, and the interface converting assembly connects the common interface to the interface 1 according to the control signal corresponding to the interface 1 so as to implement a passage between the 5G communication module and the interface 1, and at the time, the host equipment completes a handshake operation with the communication module and enters a normal operation mode after initialization.

Next, with reference to FIG. 4, the detection assembly provided by the present embodiment is described as follows.

Figure 4:
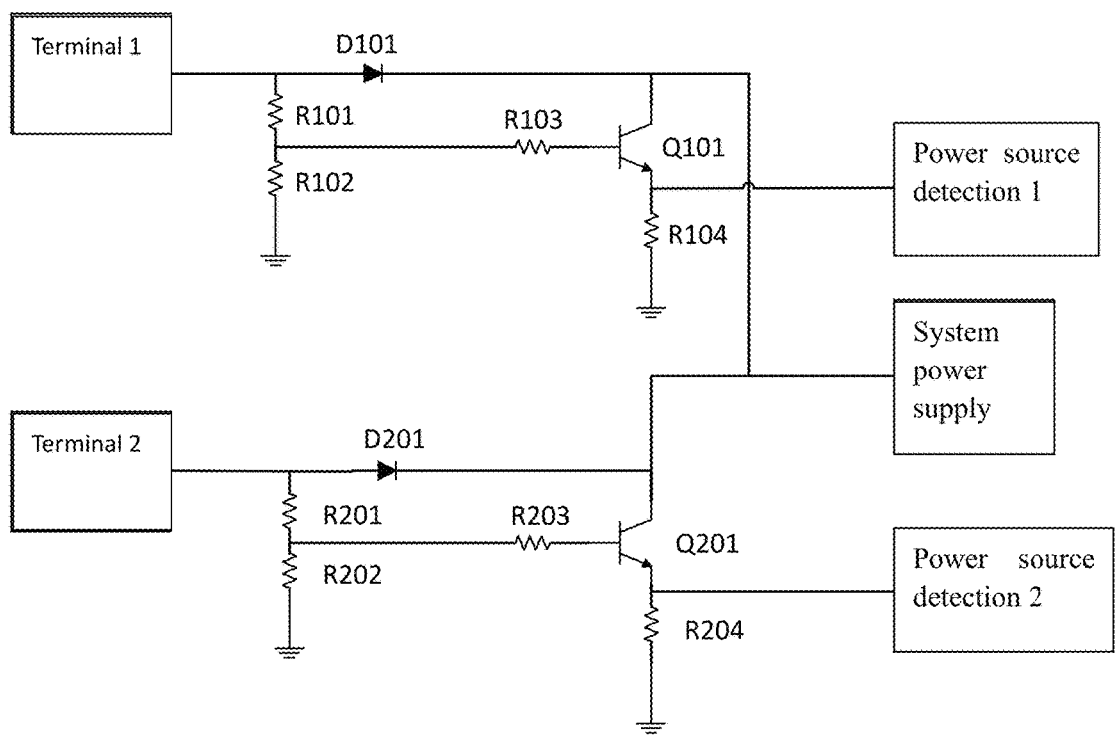
FIG. 4 is a schematic structural diagram of a detection assembly provided by an embodiment of the present disclosure.

As shown in FIG. 4, the detection assembly includes at least two groups of detection circuits, and each group of detection circuits is correspondingly connected to the external interface. Taking one group of detection circuits in FIG. 4 as an example, one group of detection circuits may include a first resistor R101, a second resistor R102, a third resistor R103, a fourth resistor R104, a transistor Q101, and a diode D101. One end of the first resistor R101 is electrically connected to an anode of the diode D101 and a terminal 1 of a corresponding peripheral interface, respectively, the other end of the first resistor R101 is electrically connected to one end of the second resistor R102 and one end of the third resistor R103, respectively, the other end of the second resistor R102 is grounded, and the other end of the third resistor R103 is electrically connected to a control electrode of the transistor Q101.

The cathode of the diode D101 is electrically connected to the first pole of the transistor Q101 and the power supply, respectively, and the second pole of the transistor Q101 is grounded via the fourth resistor R104 and electrically connected to the controller so as to input a detection voltage for a corresponding peripheral interface to the controller.

In the present embodiment, when the peripheral interface to which external device is connected with a quantity of two or more, a target interface may be selected according to the corresponding priority of the peripheral interface and a common interface may be controlled to be connected to the peripheral interface. Specifically, a detailed description may be given in conjunction with the following implementation mode.

In a specific implementation mode of the present disclosure, the controller may be configured to acquire the access priority of a peripheral interface which is connected to the external device when it is determined that the peripheral interface to which the external device is connected with a quantity of at least two according to the voltage signal, determine a target peripheral interface in the peripheral interface connected to the external device according to the access priority, generate a control signal of the target peripheral interface, and send the control signal to the interface converting assembly;

the interface converting assembly is configured to control the second end of the common interface to connect to the target peripheral interface according to the control signal.

In the present embodiment, different peripheral interfaces may connect to the corresponding external device, and the access priority of different peripheral interfaces may be pre-set in the communication module. When the controller accesses the peripheral interface with the external device according to the voltage signal and the peripheral interface with the quantity of at least two, the access priority of the peripheral interface connected with the external device is acquired, a target peripheral interface in the peripheral interface connected to the external device is determined according to the access priority, a control signal of the target peripheral interface is generated, and the control signal is sent to the interface converting assembly. For example, when the peripheral interface connected to the external device includes an interface 1, an interface 2, and an interface 3, the access priorities corresponding to the interface 1, the interface 2, and the interface 3 may be acquired, respectively; the target peripheral interface may be determined according to the access priority, for example, the priorities of the three interfaces are: interface 3>interface 1>interface 2; then the interface 3 is taken as the target peripheral interface; a control signal corresponding to the interface 3 is generated; the control signal is sent to the interface converting assembly.

It could be understood that the above-described examples are merely illustrative examples for a better understanding of the technical solutions of the embodiments of the present disclosure, and are not to be construed as the only limitations of the present embodiment.

The interface converting assembly may control the second end of the common interface to connect to the target peripheral interface according to the control signal sent by the controller.

An interface switching apparatus provided by an embodiment of the present disclosure includes: an interface converting assembly, a detection assembly, and a controller. The first end of the interface converting assembly is connected to a common interface, and the second end is connected to the controller and is configured to control the common interface to be connected to a target interface in a peripheral interface according to a control signal sent by the controller. The detection assembly is connected to the controller and at least two peripheral interfaces, respectively, and is configured to detect a voltage signal at the peripheral interface. The controller is configured to determine, according to the voltage signal, a target interface with the external device connected thereto in at least two peripheral interfaces, generate a control signal, and send the control signal to the interface converting assembly. The embodiments of the present disclosure use the means of multiple physical interfaces to complete the determining of an interface connecting to equipment via the detection of an interface voltage signal, thereby implementing the automatic switching of an interface, without using an external interface converting assembly to perform the conversion, without affecting a communication signal, and without affecting the use effect of a communication module.

In addition, an embodiment of the present disclosure also provides a communication equipment that may include the interface switching apparatus provided by the embodiments described above.

Figure 5:
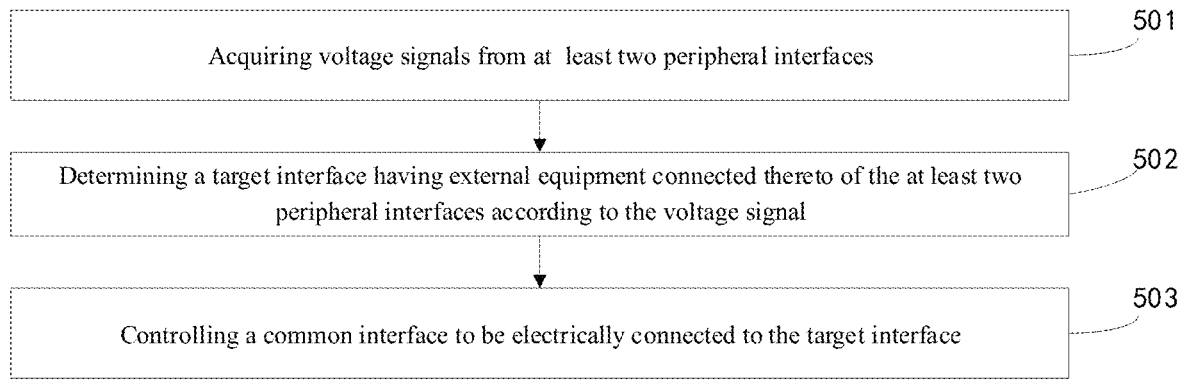
FIG. 5 is a flowchart of the steps of an interface switching method provided by an embodiment of the present disclosure.

Referring to FIG. 5, there is shown a flowchart of the steps of an interface switching method provided by an embodiment of the present disclosure. As shown in FIG. 5, the interface switching method may specifically comprise the following steps.

Step 501: acquiring voltage signals of at least two peripheral interfaces.

In the present embodiment, at least two peripheral interfaces refer to peripheral interfaces disposed on a communication module for connecting to external device, and different peripheral interfaces may connect to corresponding external device. For example, the peripheral interface may comprise a USB interface and an M2 interface, and the USB interface may be used for connecting to USB equipment, etc.

A detection assembly is disposed in the communication module, the detection assembly may be connected to the peripheral interface via a terminal, and after the communication module is connected to host equipment, the host equipment supplies power to the communication module; at this time, the detection assembly may be configured to detect a voltage signal at the terminal, namely, the voltage signal at the peripheral interface, and send the voltage signal to a controller.

After the voltage signals at the at least two peripheral interfaces are acquired, step 502 is executed.

Step 502: determining a target interface to which an external device is connected of the at least two peripheral interfaces according to the voltage signal.

The target interface refers to a peripheral interface that requires common interface switching when the external device is connected to the peripheral interface. That is, an interface that controls the common interface to connect to the peripheral interface is a target interface.

After acquiring the voltage signals of the at least two peripheral interfaces, the target interface of the at least two peripheral interfaces may be determined according to the voltage signal.

In the present embodiment, when only one peripheral interface is connected to external device, the peripheral interface connected to the external device serves as the target interface.

However, when two or more peripheral interfaces are connected to external device, the target interface may be determined from the peripheral interfaces connected to the external device according to the priority of the peripheral interfaces. Specifically, the detailed description may be made in conjunction with the following specific implementation modes.

In a specific implementation mode of the present disclosure, the above step 503 may include the following steps.

Sub-step S1: determining at least two initial peripheral interfaces to which the external devices are connected of the at least two peripheral interfaces according to the voltage signal.

In the present embodiment, the initial peripheral interface refers to a peripheral interface to which the external device is connected.

After the controller receives the voltage signal detected by the detection assembly, at least two initial peripheral interfaces connected to the external devices in at least two peripheral interfaces may be determined according to the voltage signal. For example, the peripheral interfaces may include an interface 1, an interface 2, and an interface 3, and when the external devices are connected to the interface 2 and the interface 3, the interface 2 and the interface 3 are used as the initial peripheral interfaces.

After at least two initial peripheral interfaces, to which the external devices are connected, of at least two peripheral interfaces are determined according to the voltage signal, sub-step S2 is executed.

Sub-step S2: determining a target interface of the at least two peripheral interfaces according to pre-saved access priorities of the at least two initial peripheral interfaces.

The access priority refers to a priority corresponding to a preset peripheral interface.

After acquiring at least two initial peripheral interfaces, the access priorities of the at least two initial peripheral interfaces may be acquired and the target interface of the at least two initial peripheral interfaces are determined according to the access priorities of the at least two initial peripheral interfaces. Specifically, the initial peripheral interface with the highest priority of the access priority may serve as the target interface.

After the target interface is determined, step 503 is executed.

Step 503: controlling the common interface to be electrically connected to the target interface.

After the target interface is determined, the common interface may be controlled to be electrically connected to the target interface. Specifically, after the controller determines the target interface, a control signal corresponding to the target interface may be generated by the controller, and the control signal is sent to the interface converting assembly, and the common interface is controlled to be electrically connected to the target interface by the interface converting assembly according to the control signal; at this time, the electrical connection between the communication module of the communication module and the external device connected to the target interface is implemented, and the handshake operation between the communication module and the host equipment is completed, and a normal operation mode is entered after initialization.

According to the interface switching method provided by an embodiment of the present disclosure, the common interface is controlled to be electrically connected to the target interface by acquiring voltage signals of at least two peripheral interfaces, and determining a target interface with the external device connected thereto in at least two peripheral interfaces according to the voltage signals. The embodiments of the present disclosure use the means of multiple physical interfaces to complete the determining of an interface connecting to equipment via the detection of an interface voltage signal, thereby implementing the automatic switching of an interface, without using an external interface converting assembly to perform the conversion, without affecting a communication signal, and without affecting the use effect of a communication module.

The device embodiments described above are merely schematic. The units described as separate components may or may not be physically separated, and components displayed as units may or may not be physical units, that is, may be located in one place, or may be distributed to multiple network units. Some or all of the modules may be selected to achieve the object of the embodiment solution according to actual requirements. A person of ordinary skills in the art would have been able to understand and implement the same without involving inventive efforts.

Various component embodiments of the present disclosure may be implemented in hardware, or in a software module running on one or more processors, or in a combination thereof. Those skilled in the art should understand that a microprocessor or a digital signal processor (DSP) may be used in practice to implement some or all of the functions of some or all of the components in computing processing equipment according to embodiments of the present disclosure. The present disclosure may also be implemented as some or all equipment or device programs (e.g., computer programs and computer program products) for executing the method described herein. Such a program implementing the present disclosure may be stored on a computer-readable medium or may have the form of one or more signals. Such signals may be downloaded from an Internet website, provided on a carrier signal, or provided in any other form.

Figure 6:
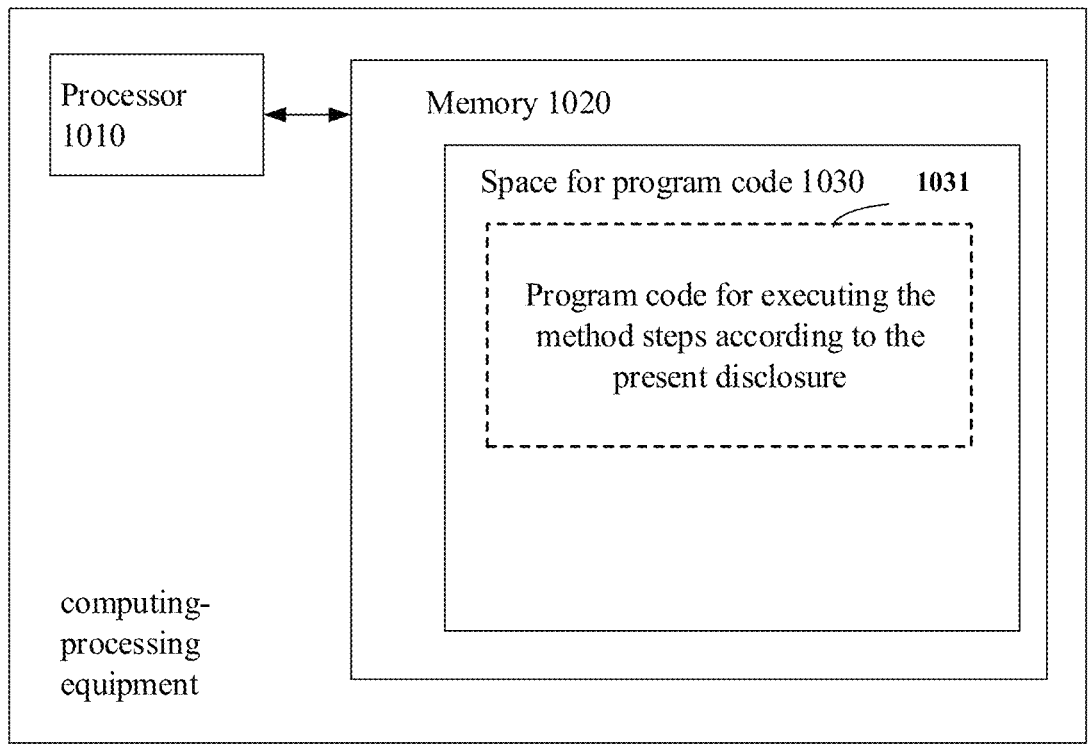
FIG. 6 schematically shows a block diagram of a computing-processing device for executing a method according to the present disclosure.
Figure 7:
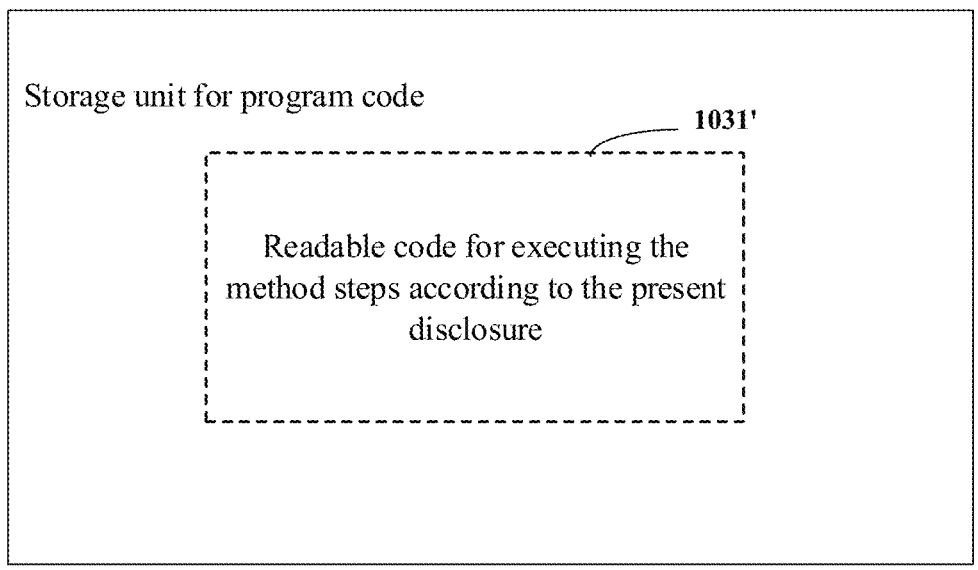
FIG. 7 schematically shows a storage unit for holding or carrying a program code implementing a method according to the present disclosure.

For example, FIG. 6 shows computing-processing device that may implement the method according to the present disclosure. The computing-processing device conventionally includes a processor 1010, and a computer program product or computer readable medium in the form of a memory 1020. Memory 1020 may be electronic memory such as flash memory, EEPROM (Electrically Erasable Programmable Read Only Memory), EPROM, hard disk, or ROM. Memory 1020 has a storage space 1030 for program code 1031 for executing any of the method steps in the method described above. For example, the storage space 1030 for program code may include respective program code 1031 for implementing various steps in the above method respectively. These program codes may be read from or written to one or more computer program products. These computer program products include a program code carrier such as a hard disk, a compact disc (CD), a memory card, or a floppy disk. Such a computer program product is typically a portable or fixed storage unit as described with reference to FIG. 7. The storage unit may have a memory segment, storage space, etc. arranged similarly to the memory 1020 in the computing-processing device of FIG. 6. The program code may, for example, be compressed in a suitable form. Generally, the memory unit includes a computer readable code 1031', that is, a code that may be read by a processor, such as, for example, 1010. When run by the computing-processing device, these codes cause the computing-processing device to execute various steps in the method described above.

For the foregoing method embodiments, for the sake of simple description, they are all expressed as a series of action combinations. But those skilled in the art should know that the present disclosure is not limited by the described action sequence. Because according to the present disclosure, certain steps may be performed in other orders or simultaneously. Secondly, those skilled in the art should also know that the embodiments described in the description are all preferred embodiments, and the actions and modules involved are not necessarily essential to the present disclosure.

In the description provided herein, numerous specific details are set forth. However, it may be understood that embodiments of the present disclosure may be practiced without these specific details. In some examples, well-known methods, structures, and techniques have not been shown in detail in order not to obscure the understanding of the present description.

Each embodiment in the present description is illustrated in a progressive manner, with each embodiment focusing on differences from the other embodiments and like parts between each embodiment referring to each other.

Finally, it also needs to be noted that relational terms such as first and second, and the like, used herein are only intended to distinguish one entity or operation from another entity or operation, and do not necessarily require or imply that any such actual relationship or sequence exists between these entities or operations. Furthermore, the terms "comprise", "include", or any other variation thereof, are intended to cover a non-exclusive inclusion, such that a process, method, article, or equipment that comprises a list of elements not only includes those elements but also includes other elements not expressly listed, or further includes elements inherent to such a process, method, article, or equipment. In a case without further limitations, an element defined by the phrase "comprising one . . . " does not preclude the presence of additional identical elements in the process, method, article, or equipment that includes the element.

An interface switching apparatus, communication equipment, and an interface switching method provided in the present disclosure are described in detail above. While specific examples have been employed herein to illustrate the principles and implementation modes of the present disclosure, the foregoing illustrations of the embodiments have been presented only to aid in the understanding of the method and core concept of the present disclosure; at the same time, for those of ordinary skills in the art, according to the concept of the present disclosure, there will be changes in the preferred embodiments and application scope. In summary, the content of the present description should not be construed as a limitation of the present disclosure.

The invention claimed is:

1. An interface switching apparatus, wherein the interface switching apparatus comprises: an interface converting assembly, a detection assembly, and a controller;
   a first end of the interface converting assembly is connected to a common interface, a second end of the interface converting assembly is connected to the controller, and the interface converting assembly is configured to control the common interface to connect to a target interface of at least two peripheral interfaces according to a control signal sent by the controller;
   the detection assembly is connected to the controller and the at least two peripheral interfaces, respectively, and the detection assembly is configured to detect voltage signals at the at least two peripheral interfaces; and
   the controller is configured to determine a target interface to which an external device is connected of the at least two peripheral interfaces according to the voltage signal, and generate the control signal, and send the control signal to the interface converting assembly;
   wherein the interface switching apparatus further comprises a voltage converting assembly;
   the voltage converting assembly is connected to the interface converting assembly and the controller, respectively, and the voltage converting assembly is configured to convert a voltage supplied from an external power source to the interface converting assembly and the controller, and output a converted voltage to the interface converting assembly and the controller, respectively.

2. The interface switching apparatus according to claim 1, wherein the detection assembly comprises at least two groups of detection circuits, each group of detection circuits is correspondingly connected to the peripheral interface, and each group of the detection circuits comprises: a first resistor, a second resistor, a third resistor, a fourth resistor, a transistor, and a diode;
   one end of the first resistor is electrically connected to an anode of the diode and a corresponding peripheral interface, respectively, and the other end of the first resistor is electrically connected to one end of the second resistor and one end of the third resistor, respectively;
   the other end of the second resistor is grounded, and the other end of the third resistor is electrically connected to a control electrode of the transistor;
   a cathode of the diode is electrically connected to a first pole of the transistor and a power supply power source, respectively; and
   a second pole of the transistor is grounded through the fourth resistor and is electrically connected to the controller, and is configured to input a detection voltage to the controller, wherein the detection voltage is for detecting the corresponding peripheral interface.

3. The interface switching apparatus according to claim 1, wherein the interface switching apparatus further comprises a communication module;
   the communication module is connected to the voltage converting assembly and the common interface, respectively.

4. The interface switching apparatus according to claim 3, wherein the communication module is a 5G communication module.

5. The interface switching apparatus according to claim 1, wherein the controller is configured to, when it is determined that there are at least two peripheral interfaces connected with the external devices, acquire access priorities of the peripheral interfaces connected with the external devices according to the voltage signal, determine a target peripheral interface in the peripheral interfaces connected with the external devices according to the access priorities, generate a control signal for controlling the target peripheral interface, and send the control signal to the interface converting assembly; and
   the interface converting assembly is configured to control the second end of the common interface to connect to the target peripheral interface according to the control signal.

6. The interface switching apparatus according to claim 1, wherein the peripheral interface is at least two of a USB interface, a PCIE interface, and an M2 interface.

7. The interface switching apparatus according to claim 1, wherein, the interface switching apparatus comprises at least two detection assemblies and at least two peripheral interfaces, the quantity of the detection assemblies is in consistent with the quantity of the peripheral interfaces.

8. Communication equipment, wherein the communication equipment comprises an interface switching apparatus, wherein the interface switching apparatus comprises:
   an interface converting assembly, a detection assembly, and a controller;
   a first end of the interface converting assembly is connected to a common interface, a second end of the interface converting assembly is connected to the controller, and the interface converting assembly is configured to control the common interface to connect to a target interface of at least two peripheral interfaces according to a control signal sent by the controller;
   the detection assembly is connected to the controller and the at least two peripheral interfaces, respectively, and the detection assembly is configured to detect voltage signals at the at least two peripheral interfaces; and
   the controller is configured to determine a target interface to which an external device is connected of the at least two peripheral interfaces according to the voltage signal, and generate the control signal, and send the control signal to the interface converting assembly;
   wherein the interface switching apparatus further comprises a voltage converting assembly;
   the voltage converting assembly is connected to the interface converting assembly and the controller, respectively, and the voltage converting assembly is configured to convert a voltage supplied from an external power source to the interface converting assembly and the controller, and output a converted voltage to the interface converting assembly and the controller, respectively.

9. An interface switching method, applied to an interface switching apparatus, wherein the interface switching apparatus comprises an interface converting assembly, a detection assembly, and a controller, wherein the interface switching method comprises:
acquiring, by the detection assembly, voltage signals of at least two peripheral interfaces;
determining, by the controller, a target interface to which an external device is connected of the at least two peripheral interfaces according to the voltage signal; and
controlling, by interface converting assembly, a common interface to be electrically connected to the target interface;
wherein the interface switching apparatus further comprises a voltage converting assembly;
the voltage converting assembly is connected to the interface converting assembly and the controller, respectively, and the voltage converting assembly is configured to convert a voltage supplied from an external power source to the interface converting assembly and the controller, and output a converted voltage to the interface converting assembly and the controller, respectively.

10. The method according to claim 9, wherein the step of determining, by the controller, a target interface to which an external device is connected of the at least two peripheral interfaces according to the voltage signal comprises:
determining at least two initial peripheral interfaces to which external devices are connected of the at least two peripheral interfaces according to the voltage signal; and
determining a target interface of the at least two peripheral interfaces according to pre-saved access priorities of the at least two initial peripheral interfaces.

11. A computing-processing device, wherein the computing-processing device comprises:
a memory in which a computer readable code is stored; and
one or more processors, wherein when the computer readable code is executed by one or more processors, the computing-processing device executes the interface switching method according to claim 9.

12. A computer-readable medium, wherein the computer-readable medium stores the computer program, when the computer program is executed, the interface switching method according to claim 9 is executed.

13. The communication equipment according to claim 8, wherein the detection assembly comprises at least two groups of detection circuits, each group of detection circuits is correspondingly connected to the peripheral interface, and each group of the detection circuits comprises: a first resistor, a second resistor, a third resistor, a fourth resistor, a transistor, and a diode;
one end of the first resistor is electrically connected to an anode of the diode and a corresponding peripheral interface, respectively, and the other end of the first resistor is electrically connected to one end of the second resistor and one end of the third resistor, respectively;
the other end of the second resistor is grounded, and the other end of the third resistor is electrically connected to a control electrode of the transistor;
a cathode of the diode is electrically connected to a first pole of the transistor and a power supply power source, respectively; and
a second pole of the transistor is grounded through the fourth resistor and is electrically connected to the controller, and is configured to input a detection voltage to the controller, wherein the detection voltage is for detecting the corresponding peripheral interface.

14. The communication equipment according to claim 8, wherein the controller is configured to, when it is determined that there are at least two peripheral interfaces connected with the external devices, acquire access priorities of the peripheral interfaces connected with the external devices according to the voltage signal, determine a target peripheral interface in the peripheral interfaces connected with the external devices according to the access priorities, generate a control signal for controlling the target peripheral interface, and send the control signal to the interface converting assembly; and
the interface converting assembly is configured to control the second end of the common interface to connect to the target peripheral interface according to the control signal.

15. The communication equipment according to claim 8, wherein the peripheral interface is at least two of a USB interface, a PCIE interface, and an M2 interface.

16. The communication equipment according to claim 8, wherein, the interface switching apparatus comprises at least two detection assemblies and at least two peripheral interfaces, the quantity of the detection assemblies is in consistent with the quantity of the peripheral interfaces.

17. The communication equipment according to claim 8, wherein the interface switching apparatus further comprises a communication module;
the communication module is connected to the voltage converting assembly and the common interface, respectively.

18. The communication equipment according to claim 17, wherein the communication module is a 5G communication module.

* * * * *